(12) United States Patent
Jung et al.

(10) Patent No.: US 8,808,918 B2
(45) Date of Patent: *Aug. 19, 2014

(54) RECHARGEABLE LITHIUM BATTERY

(75) Inventors: Euy-Young Jung, Suwon-si (KR);
Duck-Chul Hwang, Suwon-si (KR);
Jeom-Soo Kim, Suwon-si (KR);
Jong-Hwa Lee, Suwon-si (KR);
Yong-Chul Park, Suwon-si (KR);
Jae-Yul Ryu, Suwon-si (KR); So-Hyun Hur, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1764 days.

This patent is subject to a terminal disclaimer.

(21) Appl. No.: 11/808,732

(22) Filed: Jun. 12, 2007

(65) Prior Publication Data

US 2008/0118847 A1   May 22, 2008

(30) Foreign Application Priority Data

Nov. 20, 2006   (KR) .......................... 10-2006-0114612

(51) Int. Cl.
*H01M 4/13* (2010.01)

(52) U.S. Cl.
USPC .................. 429/231.3; 429/231.1; 429/231.6; 429/231.5; 429/209; 429/223; 429/224; 429/231.8; 429/231.4; 429/307; 429/339; 429/200; 429/330; 429/336; 429/341; 429/342; 429/343; 427/58; 427/126.3; 427/126.4; 427/126.6; 252/182.1

(58) Field of Classification Search
CPC ....... H01M 4/131; H01M 4/133; H01M 4/36; H01M 4/366; H01M 4/505; H01M 4/525; H01M 4/583; H01M 4/587; H01M 10/0525; H01M 10/0568; H01M 10/0569; H01M 2004/027; H01M 2004/028; H01M 2300/0028; H01M 2300/0037
USPC ............ 429/231.1, 231.3, 231.6, 231.5, 209, 429/223, 224, 231.8, 231.4, 307, 339, 200, 429/330, 336, 341, 342, 343; 427/58, 427/126.3, 126.4, 126.6; 252/182.1
See application file for complete search history.

(56) References Cited

U.S. PATENT DOCUMENTS

| | | | |
|---|---|---|---|
| 7,335,446 B2* | 2/2008 | Chiga et al. | 429/231.3 |
| 7,622,222 B2* | 11/2009 | Chiga et al. | 429/231.1 |
| 8,268,486 B2* | 9/2012 | Hwang et al. | 429/231.3 |
| 2004/0013946 A1* | 1/2004 | Abe et al. | 429/231.8 |
| 2005/0208371 A1* | 9/2005 | Kim et al. | 429/332 |
| 2006/0024584 A1* | 2/2006 | Kim et al. | 429/339 |
| 2007/0231705 A1* | 10/2007 | Ohzuku et al. | 429/231.1 |
| 2008/0248396 A1* | 10/2008 | Jung et al. | 429/223 |

FOREIGN PATENT DOCUMENTS

| | | |
|---|---|---|
| KR | 10-2000-0073252 | 5/2000 |
| KR | 10-2001-0104150 | 11/2001 |
| KR | 10-2002-0029813 | 4/2002 |

* cited by examiner

*Primary Examiner* — Laura Weiner
(74) *Attorney, Agent, or Firm* — Robert E. Busnell, Esq.

(57) ABSTRACT

The rechargeable lithium battery of the present invention includes a positive electrode including a positive active material, a negative electrode including a negative active material, and a non-aqueous electrolyte. The positive active material includes a core and a coating layer formed on the core. The core is made of a material such as $LiCo_{0.98}M'_{0.02}O_2$, and the coating layer is made of a material such as $M_xP_yO_z$. The electrolyte solution includes a nitrile-based additive. The rechargeable lithium battery of the present invention shows higher cycle-life characteristics and longer continuous charging time at high temperature.

23 Claims, 1 Drawing Sheet

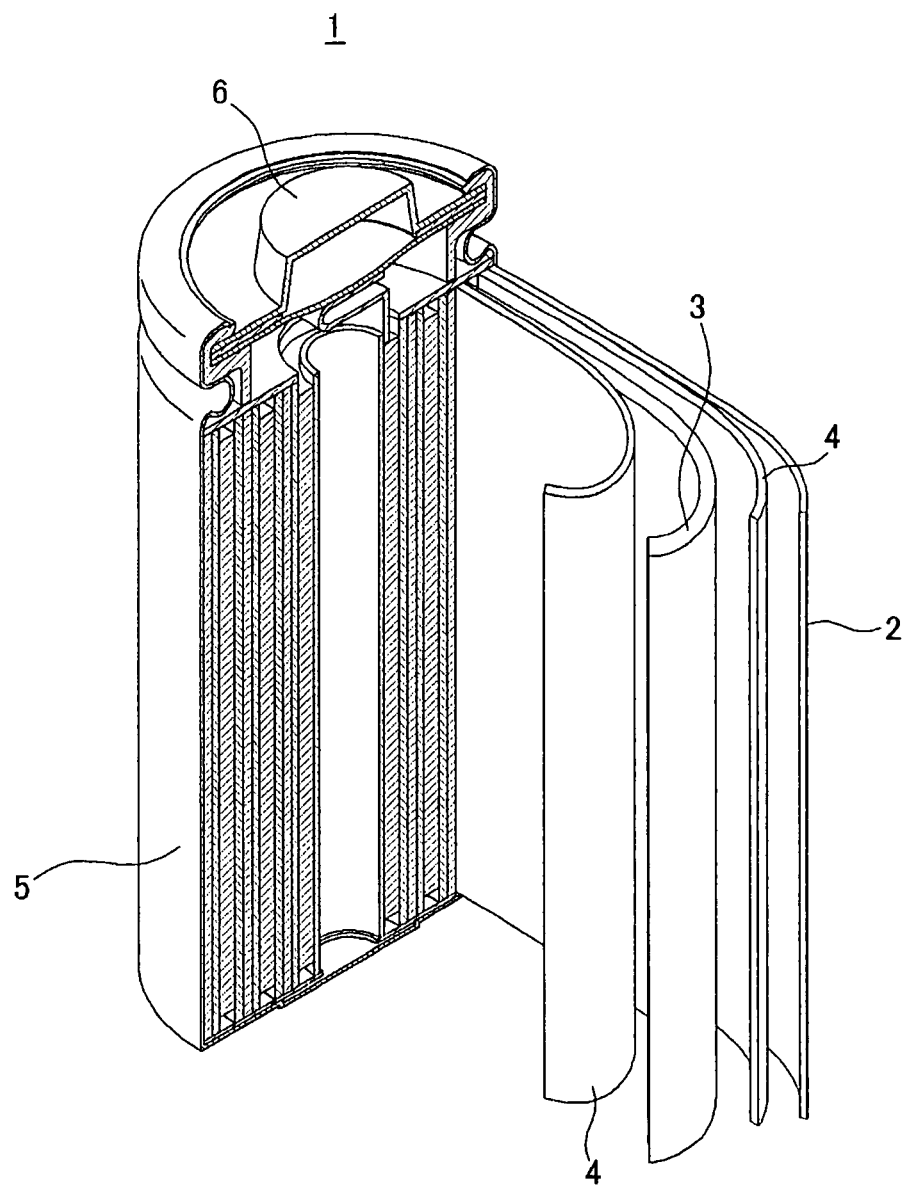

RECHARGEABLE LITHIUM BATTERY

CLAIM OF PRIORITY

This application makes reference to, incorporates the same herein, and claims all benefits accruing under 35 U.S.C. §119 from an application for RECHARGEABLE LITHIUM BATTERY earlier filed in the Korean Intellectual Property Office on the 20$^{th}$ day of Nov. 2006, and there duly assigned Ser. No. 10-2006-0114612.

BACKGROUND OF THE INVENTION

1. Field of the Invention

The present invention relates to a rechargeable lithium battery, more particularly to a rechargeable lithium battery having excellent cycle-life characteristics and stability.

2. Description of the Related Art

A lithium rechargeable battery has recently drawn attention as a power source of a small portable electronic device. It uses an organic electrolyte solution and thereby has a discharge voltage twice as high as a contemporary battery using an alkali aqueous solution, and accordingly has a higher energy density.

For a positive active material of a rechargeable lithium battery, lithium-transition element composite oxides capable of intercalating lithium such as $LiCoO_2$, $LiMn_2O_4$, $LiNiO_2$, $LiNi_{1-x}Co_xO_2$ (0<x<1), $LiMnO_2$, and so on have been investigated. For a negative active material of a rechargeable lithium battery, various carbonaceous materials, such as artificial and natural graphite, and hard carbon, have been used, which may all intercalate and deintercalate lithium ions.

Positive and negative electrodes of a rechargeable lithium battery may be unstable depending on a charge state at temperature of 25° C. or more, and may thereby induce decomposition of an electrolyte salt, an organic solvent, and positive and negative active materials. This decomposition causes serious deterioration of battery stability and safety.

In order to solve these problems, an electrolyte including 0.001 to 0.1 mol/L of an organic compound having at least two cyano groups has been suggested. However, sufficient stability and safety is not realized.

High-capacity batteries are required to meet the demand of customers, while high-level stability and safety are also required. It is, however, difficult to satisfy both requirements.

SUMMARY OF THE INVENTION

One embodiment of the present invention provides a rechargeable lithium battery that shows high capacity, and improved stability.

According to an embodiment of the present invention, provided is a rechargeable lithium battery including a positive electrode including a positive active material, a negative electrode including a negative active material, and a non-aqueous electrolyte.

The positive active material includes a core that is made of at least one of compounds represented by Formulas I to X, and a coating layer formed on the core. The coating layer includes a material represented by $M_xP_yO_z$. Herein, M is selected from the group consisting of an alkali metal, an alkaline-earth metal, a Group 13 element, a Group 14 element, a transition element, a rare earth element, and combinations thereof, 1≤x≤4, 0≤y≤7, and 2≤z≤30.

$$Li_{a1}Ni_{b1}CO_cMn_dM'_eO_2 \quad \text{Formula I}$$

wherein 0.95≤a1≤1.1, 0≤b1≤0.999, 0≤c≤0.999, 0≤d≤0.999, 0.001≤e≤0.2, and M' is selected from the group consisting of an alkali metal, an alkaline-earth metal, a Group 13 element, a Group 14 element, a transition element, a rare earth element, and combinations thereof. According to one embodiment, 0.005≤e≤0.1, 0≤d≤0.667, and M' is selected from the group consisting of Mg, Al, Ti, and combinations thereof.

$$Li_{a2}Mn_2M'_{b2}O_4 \quad \text{Formula II}$$

wherein 0.95≤a2≤1.1, 0.001≤b2≤0.2, M' is selected from the group consisting of an alkali metal, an alkaline-earth metal, a Group 13 element, a Group 14 element, transition elements, a rare earth element, and combinations thereof. According to one embodiment, 0.005≤b2≤0.1.

$$AS_2 \quad \text{Formula III}$$

wherein A is Ti or Mo.

$$LiAS_2 \quad \text{Formula IV}$$

wherein A is Ti or Mo.

$$V_2O_5 \quad \text{Formula V}$$

$$LiV_2O_5 \quad \text{Formula VIII}$$

$$LiFeO_2 \quad \text{Formula VIII}$$

$$LiNiVO_4 \quad \text{Formula VIII}$$

$$Li_{3-a}M'_2(PO_4)_3 \quad \text{Formula IX}$$

wherein 0<a3<3, and M' is V, Cr, Mn, Co, Ni, or Cu.

$$Li_{(3-a4)}Fe_2(PO_4)_3 \quad \text{Formula X}$$

wherein 0≤a4≤2.

According to one embodiment, the core material may include a compound represented by Formulas I or II.

The amount of the coating layer ranges from 0.001 wt % to 10 wt % based on the total weight of the positive active material. According to one embodiment, the amount of the coating layer ranges from 0.005 wt % to 10 wt % based on the total weight of the positive active material. According to another embodiment, the amount of the coating layer ranges from 0.05 wt % to 5 wt % based on the total weight of the positive active material.

The non-aqueous electrolyte includes a non-aqueous organic solvent, a lithium salt, and an additive represented by Formula XI.

Formula XI

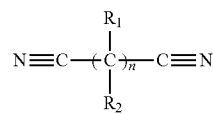

wherein R1 and R2 are the same or independently halogen or $C_mH_{(2m+1)}$, m ranges from 0 to 10, and n ranges from 1 to 12. The halogen may be F, Cl, Br, or I.

The positive electrode may have an active mass density of 3.7 g/cc to 4.2 g/cc. The rechargeable lithium battery shows a charge cut-off voltage ranging from 4.3V to 4.5V. The rechargeable lithium battery may implement a high voltage charge.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing in which like reference symbols indicate the same or similar components, wherein:

FIG. 1 is a schematic cross-sectional view of a rechargeable lithium battery constructed as one embodiment of the present invention.

DETAILED DESCRIPTION OF THE INVENTION

An exemplary embodiment of the present invention will hereinafter be described in detail with reference to the accompanying drawings.

The present invention relates to a rechargeable lithium battery that has excellent stability. The rechargeable lithium battery of the present invention also has excellent stability at trickle charge. The trickle charge stability is characterized by a time period at which current is significantly increased during continuous charging.

The rechargeable lithium battery according to an embodiment of the present invention includes a positive electrode including a positive active material, a negative electrode including a negative active material, and a non-aqueous electrolyte including a non-aqueous organic solvent and a lithium salt. The rechargeable lithium battery shows a charge cut-off voltage ranging from 4.3V to 4.5V.

The positive active material includes a core that is made of a material including a compound represented by Formulas I to X, and a coating layer formed on the core. The coating layer includes a compound represented by $M_xP_yO_z$. Herein, M is a material such as an alkali metal, an alkaline-earth metal, a Group 13 element, a Group 14 element, a transition element, a rare earth element, or combinations thereof, and $1 \leq x \leq 4$, $0 \leq y \leq 7$, and $2 \leq z \leq 30$.

$$Li_aNi_{b1}Co_cMndM'_eO_2 \quad \text{Formula I}$$

wherein $0.95 \leq a \leq 1.1$, $0 \leq b1 \leq 0.999$, $0 \leq c \leq 0.999$, $0 \leq d \leq 0.999$, $0.001 \leq e \leq 0.2$, and M' is a material such as an alkali metal, an alkaline-earth metal, a Group 13 element, a Group 14 element, a transition element, a rare earth element, or combinations thereof. If M' is a transition element, the core material can be $LiVO_2$, $LiScO_2$, $LiYO_2$, $LiCrO_2$, or so on. According to one embodiment, $0.005 \leq e \leq 0.1$, and M' is selected from a material such as Mg, Al, Ti, or combinations thereof.

$$Li_aMn_2M'_{b2}O_4 \quad \text{Formula II}$$

wherein $0.95 \leq a \leq 1.1$, $0.001 \leq b2 \leq 0.2$, and M' is a material such as an alkali metal, an alkaline-earth metal, a Group 13 element, a Group 14 element, a transition element, a rare earth element, or combinations thereof. According to one embodiment, $0.005 \leq b2 \leq 0.1$, and M' is selected from a material such as Mg, Al, Ti, or combinations thereof.

$$AS_2 \quad \text{Formula III}$$

wherein A is Ti or Mo.

$$LiAS_2 \quad \text{Formula IV}$$

wherein A is Ti or Mo.

$$V_2O_5 \quad \text{Formula V}$$

$$LiV_2O_5 \quad \text{Formula VI}$$

$$LiFeO_2 \quad \text{Formula VII}$$

$$LiNiVO_4 \quad \text{Formula VIII}$$

$$Li_{3-a}M'_2(PO_4)_3 \quad \text{Formula IX}$$

wherein $0 < a < 3$, and M' is V, Cr, Mn, Co, Ni, or Cu.

$$Li_{(3-a')}Fe_2(PO_4)_3 \quad \text{Formula X}$$

wherein $0 \leq a' \leq 2$.

An amount of the coating layer ranges from 0.001 wt % to 10 wt % based on the total weight of the positive active material. According to one embodiment, the material for core can include a compound represented by Formula I or II.

The material for the coating layer preferably includes $Al_2O_3$, $Mg_2P_2O_7$, $AlPO_4$, or $ZrO_2$. According to one embodiment, the positive active material includes a core material including a compound represented by the above Formula I or II and a coating layer material including $Al_2O_3$, $Mg_2P_2O_7$, $AlPO_4$, or $ZrO_2$. According to another embodiment, the positive active material includes a core material including a compound represented by the above Formula I or II (herein, in the above Formulas I and II, M' is a combination of Mg and Al, a combination of Mg and Ti, or a combination of Mg, Al, and Ti) and a coating layer material including $Mg_2P_2O_7$ or $Al_2O_3$.

The positive electrode may have an active mass density of 3.7 g/cc to 4.2 g/cc.

The positive electrode includes the positive active material, a binder, and a conductive agent.

The binder performs functions of binding particles of the positive active material together, and binding the positive active material to a current collector. An example of the binder includes, but is not limited to, polyvinylalcohol, carboxylmethylcellulose, hydroxypropylcellulose, diacetylenecellulose, polyvinylchloride, polyvinylpyrrolidone, polytetrafluoroethylene, polyvinylidene fluoride, polyethylene, or polypropylene.

Any electrically conductive material can be used as a conductive agent so long as it has electrical conductivity and chemical stability. An example of the conductive agent includes natural graphite, artificial graphite, carbon black, acetylene black, ketjen black, carbon fiber, a metal powder or a metal fiber including copper, nickel, aluminum, silver, and so on, or a polyphenylene derivative.

The current collector can be an aluminum foil, but is not limited thereto.

The positive electrode can be fabricated as follows. A positive active material composition is prepared by mixing a positive active material, a binder, and optionally a conductive agent, and then the composition is applied on a positive current collector of the positive electrode. The positive electrode manufacturing method is well known, and thus it is not described in detail herein.

As for a solvent for the positive active material composition, N-methylpyrrolidone can be used, but the solvent material is not limited thereto.

The non-aqueous electrolyte includes a non-aqueous organic solvent, a lithium salt, and an additive represented by Formula XI.

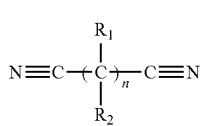

Formula XI wherein R1 and R2 are the same, or independently a halogen or $C_mH_{(2m+1)}$, m ranges from 0 to 10, and n ranges from 1 to 12. The halogen may be F, Cl, Br, or I.

An example of the compound represented by the above Formula XI includes succinonitrile, glutaronitrile, adiponitrile, pimelonitrile, suberonitrile, or combinations thereof. According to one embodiment, the compound such as succinonitrile or adiponitrile may be suitable.

The amount of the additive ranges from 0.001 wt % to 10 wt % based on the total weight of the non-aqueous electrolyte. According to one embodiment, the additive may be used in an amount of 0.01 wt % to 7 wt %. If the amount of the additive is less than 0.001 wt %, the improving effect at continuous charging at high temperature is not sufficient, while if the amount is more than 10 wt %, battery cycle-life may be deteriorated.

The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. An example of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or so on. An example of the ester-based solvent may include n-methyl acetate, n-ethyl acetate, n-propyl acetate, dimethylacetate, methylpropionate, ethylpropinonate, γ-butyrolactone, decanolide, valerolactone, mevalonolactone, caprolactone, or so on. An example of the ether-based solvent may include dibutyl ether, tetraglyme, diglyme, dimethoxyethane, 2-methyltetrahydrofuran, tetrahydrofuran, or so on. While an example of the ketone-based solvent includes cyclohexanone, or so on, An example of the alcohol solvent includes ethyl alcohol, isopropyl alcohol, or so on. An example of the aprotic solvent includes nitrile such as R—CN (wherein R is a linear, branched, or cyclic hydrocarbon, in which a number of carbons is between 2 and 20, and which includes a double bond, an aromatic ring, or an ether bond), amide such as dimethylformamide, dioxolane such as 1,3-dioxolane, sulfolane, or so on.

The non-aqueous organic solvent can be used by itself or as a mixture of solvents listed above. When the organic solvent is used as a mixture, the mixture ratio may be controlled in accordance with a desirable battery performance.

The carbonate-based solvent may include a mixture of a cyclic carbonate and a chain carbonate. When the cyclic carbonate and the chain carbonate are mixed together in a volume ratio of 1:1 to 1:9 and the mixture is used as an electrolyte, the electrolyte performance can be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent can be represented by Formula XII.

Formula XII

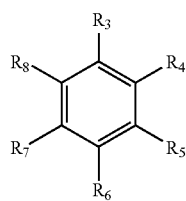

wherein $R_3$ to $R_8$ are independently selected from hydrogen, halogen, alkyl of 1 to 10 carbons, a haloalkyl, or combinations thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The electrolyte may further include an additive such as vinylene carbonate or fluoroethylene carbonate to improve cell cycle-life characteristics.

The lithium salt is dissolved in the non-aqueous organic solvent, and supplies lithium ions in the battery enabling the basic operation of a rechargeable lithium battery. Lithium ions move between positive and negative electrodes. Non-limiting example of the lithium salt includes $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_yF_{2y+1}SO_2)(C_yF_{2y+1}SO_2)$ (wherein x and y are positive integers), LiCl, LiI, lithium bisoxalate borate, or combinations thereof. The lithium salt may be used at 0.1M to 2.0M concentration. If the lithium salt concentration is less than 0.1M, electrolyte performance may be deteriorated due to lower electrolyte conductivity, while if the concentration is more than 2.0M, lithium ion mobility may be reduced due to increased electrolyte viscosity.

The negative active material in the negative electrode can include a carbonaceous material, a lithium metal, a lithium alloy, a material being capable of forming a lithium-containing compound, or combinations thereof. According to one embodiment, the carbonaceous material may be suitable for the negative active material.

The carbonaceous material may be amorphous carbon or crystalline carbon. The amorphous carbon may be a soft carbon (carbon obtained by firing at low temperature), a hard carbon (carbon obtained by firing at high temperature), mesophase pitch carbide, fired coke, or so on. The crystalline carbon may be natural graphite or artificial graphite, which has no-shape, or sheet, flake, spherical, or fiber shape.

The carbonaceous material has an Lc (crystallite size) of at least 10 nm. The Lc can be detected through X-ray diffraction using a CuKα. According to one embodiment, the carbonaceous material has an Lc (crystallite size) of 100 nm to 1500 nm. The carbonaceous material may exhibits an exothermic peak at higher than or equal to 700° C. Crystalline carbon or amorphous carbon can be determined by the temperature of exothermic peak. The exothermic peak at higher than or equal to 700° C. indicates crystalline carbon, and therefore the maximum value of the exothermic temperature need not be limited.

The crystalline carbon may be a carbon prepared by carbonizing mesophase spherical particles and performing a graphitizing step on the carbonized material. Furthermore, the carbonaceous material may be a graphite fiber prepared by carbonizing a mesophase pitch fiber and performing a graphitizing step on the carbonized material.

The lithium alloy includes lithium and a metal such as Na, K, Rb, Cs, Fr, Be, Mg, Ca, Sr, Ba, Ra, Al, or Sn.

The material being capable of reversibly forming a lithium-containing compound by reaction with lithium ions includes tin oxide ($SnO_2$), titanium nitrate, silicon (Si), or so on, but is not limited thereto.

The negative electrode includes the negative active material, a binder, and a conductive agent.

Examples of the binder include polyvinyl alcohol, carboxylmethyl cellulose, hydroxypropyl cellulose, diacetylene cellulose, polyvinyl chloride, polyvinyl pyrrolidone, polytetrafluoroethylene, polyvinylidene fluoride, polyethylene, and polypropylene, but are not limited thereto.

Any electrically conductive material may be used as a conductive agent so long as it has electrical conductivity and chemical stability. Examples of the conductive agent include natural graphite, artificial graphite, carbon black, acetylene black, ketjen black, a carbon fiber, a metal powder or a metal fiber including copper, nickel, aluminum, silver, and so on, and a polyphenylene derivative.

The current collector may be selected from the group consisting of a copper foil, a nickel foil, a stainless steel foil, a titanium foil, a nickel foam, a copper foam, a polymer substrate coated with a conductive metal, and combinations thereof.

The negative electrode may be fabricated as follows. A negative active material composition is prepared by mixing a negative active material, a binder, and a conductive agent, and then the composition is applied on a negative current collector. The negative electrode manufacturing method is well known, and thus it is not described in detail herein. As for the solvent of the negative active material composition, N-methylpyrrolidone may be used, but is not limited thereto.

The rechargeable lithium battery generally includes a positive electrode, a negative electrode, and an electrolyte. The battery may further include a separator as needed. The separator may include any material used in contemporary lithium secondary batteries. Non-limiting example of suitable separator materials includes polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, including cylindrical, prismatic, or coin-type batteries. The rechargeable lithium batteries can be a thin film battery, or can be rather bulky in size.

FIG. 1 is a schematic cross-sectional view of a rechargeable lithium battery constructed as one embodiment of the present invention. Referring to FIG. 1, rechargeable lithium battery 1 is constructed of negative electrode 2, positive electrode 3, separator 4 interposed between positive electrode 3 and negative electrode 2, and an electrolyte in which separator 4 is immersed. Rechargeable lithium battery 1 also includes cell case 5 and sealing member 6 for sealing cell case 5.

The following examples illustrate the present invention in more detail. These examples, however, should not in any sense be interpreted as limiting the scope of the present invention.

EXAMPLE 1

A $LiCo_{0.98}Mg_{0.02}O_2$ positive active material including an $Al_2O_3$ coating layer, a polyvinylidene fluoride binder, and a Super-P conductive material were mixed in a weight ratio of 96:2:2 in a N-methylpyrrolidone solvent to prepare a positive active material composition. The amount of the $Al_2O_3$ coating layer was 0.1 wt % based on the total weight of the positive active material. The positive active material composition was coated on an aluminum current collector a positive electrode, then dried and compressed to fabricate a positive electrode. The active mass density of the positive electrode was 3.73 g/cc.

A graphite negative active material and a polyvinylidene fluoride binder were mixed in a weight ratio of 94:6 in a N-methylpyrrolidone solvent to prepare a negative active material slurry. The slurry was coated on a copper current collector, then dried and compressed to fabricate a negative electrode. The graphite negative active material had an Lc (crystallite size) of about 100 nm, measured by X-ray diffraction, and the graphite negative active material showed an exothermic peak at temperature higher than or equal to 700° C.

1.3M $LiPF_6$ was dissolved in a mixed solvent of ethylene carbonate, dimethyl carbonate, and ethylmethyl carbonate in a volume ratio of 30:30:40, and then succinonitrile was added to prepare an electrolyte solution. The succinonitrile was added in an amount of 2 wt % of the total weight of the electrolyte solution.

A rechargeable lithium battery cell was fabricated using the above positive electrode, negative electrode, and electrolyte solution.

EXAMPLE 2

A rechargeable lithium battery cell was fabricated according to the same method as described in Example 1, except that glutaronitrile was used instead of succinonitrile.

EXAMPLE 3

A rechargeable lithium battery cell was fabricated according to the same method as described in Example 1, except that adiponitrile was used instead of succinonitrile

EXAMPLE 4

A rechargeable lithium battery cell was fabricated according to the same method as described in Example 1, except that pimelonitrile was used instead of succinonitrile.

EXAMPLE 5

A rechargeable lithium battery cell was fabricated according to the same method as described in Example 1, except that suberonitrile was used instead of succinonitrile.

EXAMPLE 6

A rechargeable lithium battery cell was fabricated according to the same method as described in Example 1, except that a $LiCo_{0.98}Mg_{0.02}O_2$ positive active material including a $Mg_2P_2O_7$ coating layer was used instead of the $LiCo_{0.98}Mg_{0.02}O_2$ positive active material including an $Al_2O_3$ coating layer.

EXAMPLE 7

A rechargeable lithium battery cell was fabricated according to the same method as described in Example 6, except that glutaronitrile was used instead of succinonitrile.

EXAMPLE 8

A rechargeable lithium battery cell was fabricated according to the same method as described in Example 6, except that adiponitrile was used instead of succinonitrile.

EXAMPLE 9

A rechargeable lithium battery cell was fabricated according to the same method as described in Example 6, except that pimelonitrile was used instead of succinonitrile.

EXAMPLE 10

A rechargeable lithium battery cell was fabricated according to the same method as described in Example 6, except that suberonitrile was used instead of succinonitrile.

EXAMPLE 11

A rechargeable lithium battery cell was fabricated according to the same method as described in Example 1, except that a $LiCo_{0.98}Mg_{0.02}O_2$ positive active material including an $AlPO_4$ coating layer was used instead of the $LiCo_{0.98}Mg_{0.02}O_2$ positive active material including an $Al_2O_3$ coating layer.

EXAMPLE 12

A rechargeable lithium battery cell was fabricated according to the same method as described in Example 1, except that glutaronitrile was used instead of succinonitrile.

EXAMPLE 13

A rechargeable lithium battery cell was fabricated according to the same method as described in Example 11, except that adiponitrile was used instead of succinonitrile.

EXAMPLE 14

A rechargeable lithium battery cell was fabricated according to the same method as described in Example 11, except that pimelonitrile was used instead of succinonitrile.

EXAMPLE 15

A rechargeable lithium battery cell was fabricated according to the same method as described in Example 11, except that suberonitrile was used instead of succinonitrile.

EXAMPLE 16

A rechargeable lithium battery cell was fabricated according to the same method as described in Example 11, except that a $LiCo_{0.98}Mg_{0.02}O_2$ positive active material including a $ZrO_2$ coating layer was used instead of the $LiCo_{0.98}Mg_{0.02}O_2$ positive active material including an $Al_2O_3$ coating layer.

EXAMPLE 17

A rechargeable lithium battery cell was fabricated according to the same method as described in Example 16, except that glutaronitrile was used instead of succinonitrile.

EXAMPLE 18

A rechargeable lithium battery cell was fabricated according to the same method as described in Example 16, except that adiponitrile was used instead of succinonitrile.

EXAMPLE 19

A rechargeable lithium battery cell was fabricated according to the same method as described in Example 16, except that pimelonitrile was used instead of succinonitrile.

EXAMPLE 20

A rechargeable lithium battery cell was fabricated according to the same method as described in Example 16, except that suberonitrile was used instead of succinonitrile.

EXAMPLE 21

A rechargeable lithium battery cell was fabricated according to the same method as described in Example 1, except that a $LiCo_{0.979}Mg_{0.02}Al_{0.02}O_2$ positive active material including an $Al_2O_3$ coating layer was used instead of the $LiCo_{0.98}Mg_{0.02}O_2$ positive active material including an $Al_2O_3$ coating layer.

EXAMPLE 22

A rechargeable lithium battery cell was fabricated according to the same method as described in Example 21, except that glutaronitrile was used instead of succinonitrile.

EXAMPLE 23

A rechargeable lithium battery cell was fabricated according to the same method as described in Example 21, except that adiponitrile was used instead of succinonitrile.

EXAMPLE 24

A rechargeable lithium battery cell was fabricated according to the same method as described in Example 21, except that pimelonitrile was used instead of succinonitrile.

EXAMPLE 25

A rechargeable lithium battery cell was fabricated according to the same method as described in Example 21, except that suberonitrile was used instead of succinonitrile.

EXAMPLE 26

A rechargeable lithium battery cell was fabricated according to the same method as described in Example 21, except that a $LiCo_{0.979}Mg_{0.02}Al_{0.001}O_2$ positive active material including a $Mg_2P_2O_7$ coating layer was used instead of the $LiCo_{0.979}Mg_{0.02}Al_{0.001}O_2$ positive active material including an $Al_2O_3$ coating layer.

EXAMPLE 27

A rechargeable lithium battery cell was fabricated according to the same method as described in Example 26, except that glutaronitrile was used instead of succinonitrile.

EXAMPLE 28

A rechargeable lithium battery cell was fabricated according to the same method as described in Example 26, except that adiponitrile was used instead of succinonitrile.

EXAMPLE 29

A rechargeable lithium battery cell was fabricated according to the same method as described in Example 26, except that pimelonitrile was used instead of succinonitrile.

EXAMPLE 30

A rechargeable lithium battery cell was fabricated according to the same method as described in Example 26, except that suberonitrile was used instead of succinonitrile.

EXAMPLE 31

A rechargeable lithium battery cell was fabricated according to the same method as described in Example 21, except that a $LiCo_{0.979}Mg_{0.02}Al_{0.001}O_2$ positive active material including an $AlPO_4$ coating layer was used instead of the $LiCo_{0.979}Mg_{0.02}Al_{0.001}O_2$ positive active material including an $Al_2O_3$ coating layer.

EXAMPLE 32

A rechargeable lithium battery cell was fabricated according to the same method as described in Example 31, except that glutaronitrile was used instead of succinonitrile.

EXAMPLE 33

A rechargeable lithium battery cell was fabricated according to the same method as described in Example 32, except that adiponitrile was used instead of succinonitrile.

EXAMPLE 34

A rechargeable lithium battery cell was fabricated according to the same method as described in Example 32, except that pimelonitrile was used instead of succinonitrile.

EXAMPLE 35

A rechargeable lithium battery cell was fabricated according to the same method as described in Example 32, except that suberonitrile was used instead of succinonitrile.

EXAMPLE 36

A rechargeable lithium battery cell was fabricated according to the same method as described in Example 21, except that a $LiCo_{0.979}Mg_{0.02}Al_{0.001}O_2$ positive active material including a $ZrO_2$ coating layer was used instead of the $LiCo_{0.979}Mg_{0.02}Al_{0.001}O_2$ positive active material including an $Al_2O_3$ coating layer.

EXAMPLE 37

A rechargeable lithium battery cell was fabricated according to the same method as described in Example 36, except that glutaronitrile was used instead of succinonitrile.

EXAMPLE 38

A rechargeable lithium battery cell was fabricated according to the same method as described in Example 36, except that adiponitrile was used instead of succinonitrile.

EXAMPLE 39

A rechargeable lithium battery cell was fabricated according to the same method as described in Example 36, except that pimelonitrile was used instead of succinonitrile.

EXAMPLE 40

A rechargeable lithium battery cell was fabricated according to the same method as described in Example 36, except that suberonitrile was used instead of succinonitrile.

EXAMPLE 41

A rechargeable lithium battery cell was fabricated according to the same method as described in Example 1, except that a $LiCo_{0.991}Mg_{0.007}Ti_{0.002}O_2$ positive active material including an $Al_2O_3$ coating layer was used instead of the $LiCo_{0.98}Mg_{0.02}O_2$ positive active material including an $Al_2O_3$ coating layer.

EXAMPLE 42

A rechargeable lithium battery cell was fabricated according to the same method as described in Example 41, except that glutaronitrile was used instead of succinonitrile.

EXAMPLE 43

A rechargeable lithium battery cell was fabricated according to the same method as described in Example 41, except that adiponitrile was used instead of succinonitrile.

EXAMPLE 44

A rechargeable lithium battery cell was fabricated according to the same method as described in Example 41, except that pimelonitrile was used instead of succinonitrile.

EXAMPLE 45

A rechargeable lithium battery cell was fabricated according to the same method as described in Example 41, except that suberonitrile was used instead of succinonitrile.

EXAMPLE 46

A rechargeable lithium battery cell was fabricated according to the same method as described in Example 41, except that a $LiCo_{0.991}Mg_{0.007}Ti_{0.002}O_2$ positive active material including a $Mg_2P_2O_7$ coating layer was used instead of the $LiCo_{0.991}Mg_{0.007}Ti_{0.002}O_2$ positive active material including an $Al_2O_3$ coating layer.

EXAMPLE 47

A rechargeable lithium battery cell was fabricated according to the same method as described in Example 46, except that glutaronitrile was used instead of succinonitrile.

EXAMPLE 48

A rechargeable lithium battery cell was fabricated according to the same method as described in Example 46, except that adiponitrile was used instead of succinonitrile.

EXAMPLE 49

A rechargeable lithium battery cell was fabricated according to the same method as described in Example 46, except that pimelonitrile was used instead of succinonitrile.

EXAMPLE 50

A rechargeable lithium battery cell was fabricated according to the same method as described in Example 46, except that suberonitrile was used instead of succinonitrile.

EXAMPLE 51

A rechargeable lithium battery cell was fabricated according to the same method as described in Example 41, except that a $LiCo_{0.991}Mg_{0.007}Ti_{0.002}O_2$ positive active material including an $AlPO_4$ coating layer was used instead of the $LiCo_{0.991}Mg_{0.007}Ti_{0.002}O_2$ positive active material including an $Al_2O_3$ coating layer.

EXAMPLE 52

A rechargeable lithium battery cell was fabricated according to the same method as described in Example 51, except that glutaronitrile was used instead of succinonitrile.

EXAMPLE 53

A rechargeable lithium battery cell was fabricated according to the same method as described in Example 51, except that adiponitrile was used instead of succinonitrile.

EXAMPLE 54

A rechargeable lithium battery cell was fabricated according to the same method as described in Example 51, except that pimelonitrile was used instead of succinonitrile.

EXAMPLE 55

A rechargeable lithium battery cell was fabricated according to the same method as described in Example 51, except that suberonitrile was used instead of succinonitrile.

EXAMPLE 56

A rechargeable lithium battery cell was fabricated according to the same method as described in Example 41, except that a $LiCo_{0.991}Mg_{0.007}Ti_{0.002}O_2$ positive active material including an $AlPO_4$ coating layer was used instead of the $LiCo_{0.991}Mg_{0.07}Ti_{0.002}O_2$ positive active material including an $Al_2O_3$ coating layer.

EXAMPLE 57

A rechargeable lithium battery cell was fabricated according to the same method as described in Example 56, except that glutaronitrile was used instead of succinonitrile.

EXAMPLE 58

A rechargeable lithium battery cell was fabricated according to the same method as described in Example 56, except that adiponitrile was used instead of succinonitrile.

EXAMPLE 59

A rechargeable lithium battery cell was fabricated according to the same method as described in Example 56, except that pimelonitrile was used instead of succinonitrile.

EXAMPLE 60

A rechargeable lithium battery cell was fabricated according to the same method as described in Example 56, except that suberonitrile was used instead of succinonitrile.

EXAMPLE 61

A rechargeable lithium battery cell was fabricated according to the same method as described in Example 1, except that a $LiCo_{0.98}Mg_{0.01}Al_{0.005}Ti_{0.005}O_2$ positive active material including an $Al_2O_3$ coating layer was used instead of the $LiCo_{0.98}Mg_{0.02}O_2$ positive active material including an $Al_2O_3$ coating layer.

EXAMPLE 62

A rechargeable lithium battery cell was fabricated according to the same method as described in Example 61, except that glutaronitrile was used instead of succinonitrile.

EXAMPLE 63

A rechargeable lithium battery cell was fabricated according to the same method as described in Example 61, except that adiponitrile was used instead of succinonitrile.

EXAMPLE 64

A rechargeable lithium battery cell was fabricated according to the same method as described in Example 61, except that pimelonitrile was used instead of succinonitrile.

EXAMPLE 65

A rechargeable lithium battery cell was fabricated according to the same method as described in Example 61, except that suberonitrile was used instead of succinonitrile.

EXAMPLE 66

A rechargeable lithium battery cell was fabricated according to the same method as described in Example 61, except that a $LiCo_{0.98}Mg_{0.01}Al_{0.005}Ti_{0.005}O_2$ positive active material including a $Mg_2P_2O_7$ coating layer was used instead of the $LiCo_{0.98}Mg_{0.01}Al_{0.005}Ti_{0.005}O_2$ positive active material including an $Al_2O_3$ coating layer.

EXAMPLE 67

A rechargeable lithium battery cell was fabricated according to the same method as described in Example 66, except that glutaronitrile was used instead of succinonitrile.

EXAMPLE 68

A rechargeable lithium battery cell was fabricated according to the same method as described in Example 66, except that adiponitrile was used instead of succinonitrile.

EXAMPLE 69

A rechargeable lithium battery cell was fabricated according to the same method as described in Example 66, except that pimelonitrile was used instead of succinonitrile.

EXAMPLE 70

A rechargeable lithium battery cell was fabricated according to the same method as described in Example 66, except that suberonitrile was used instead of succinonitrile.

EXAMPLE 71

A rechargeable lithium battery cell was fabricated according to the same method as described in Example 61, except that a $LiCo_{0.98}Mg_{0.01}Al_{0.005}Ti_{0.005}O_2$ positive active material including an $AlPO_4$ coating layer was used instead of the $LiCo_{0.98}Mg_{0.01}Al_{0.005}Ti_{0.005}O_2$ positive active material including an $Al_2O_3$ coating layer.

EXAMPLE 72

A rechargeable lithium battery cell was fabricated according to the same method as described in Example 71, except that glutaronitrile was used instead of succinonitrile.

EXAMPLE 73

A rechargeable lithium battery cell was fabricated according to the same method as described in Example 71, except that adiponitrile was used instead of succinonitrile.

EXAMPLE 74

A rechargeable lithium battery cell was fabricated according to the same method as described in Example 71, except that pimelonitrile was used instead of succinonitrile.

EXAMPLE 75

A rechargeable lithium battery cell was fabricated according to the same method as described in Example 71, except that suberonitrile was used instead of succinonitrile.

EXAMPLE 76

A rechargeable lithium battery cell was fabricated according to the same method as described in Example 61, except that a $LiCo_{0.98}Mg_{0.01}Al_{0.005}Ti_{0.005}O_2$ positive active material including a $ZrO_{27}$ coating layer was used instead of the $LiCo_{0.9}Mg_{0.01}Al_{0.005}Ti_{0.005}O_2$ positive active material including an $Al_2O_3$ coating layer.

EXAMPLE 77

A rechargeable lithium battery cell was fabricated according to the same method as described in Example 76, except that glutaronitrile was used instead of succinonitrile.

EXAMPLE 78

A rechargeable lithium battery cell was fabricated according to the same method as described in Example 76, except that adiponitrile was used instead of succinonitrile.

EXAMPLE 79

A rechargeable lithium battery cell was fabricated according to the same method as described in Example 76, except that pimelonitrile was used instead of succinonitrile.

EXAMPLE 80

A rechargeable lithium battery cell was fabricated according to the same method as described in Example 76, except that suberonitrile was used instead of succinonitrile.

COMPARATIVE EXAMPLE 1

A $LiCoO_2$ positive active material, a polyvinylidene fluoride binder, and a Super-P conductive material were mixed in a weight ratio of 96:2:2 in a N-methylpyrrolidone solvent to prepare a positive active material composition. The positive active material composition was coated on an aluminum current collector of a positive electrode, then dried and compressed to fabricate a positive electrode.

A graphite negative active material and a polyvinylidene fluoride binder were mixed in a weight ratio of 94:6 in a N-methylpyrrolidone solvent to prepare a negative active material slurry. The slurry was coated on a copper current collector, then dried and compressed to fabricate a negative electrode. The graphite negative active material had Lc (crystal size) of about 100 nm, when measured by X-ray diffraction. The graphite negative active material showed an exothermic peak at temperature higher than 700° C.

1.3M $LiPF_6$ dissolved in a mixed solvent of ethylene carbonate, dimethyl carbonate, and ethylmethyl carbonate in a volume ratio of 30:30:40 to prepare an electrolyte solution.

A rechargeable lithium battery cell was fabricated using the above positive electrode, negative electrode, and electrolyte solution.

COMPARATIVE EXAMPLE 2

A rechargeable lithium battery cell was fabricated according to the same method as described in Comparative Example 1, except that a $LiCo_{0.98}Mg_{0.02}O_2$ positive active material was used instead of the $LiCoO_2$ positive active material.

COMPARATIVE EXAMPLE 3

A rechargeable lithium battery cell was fabricated according to the same method as described in Comparative Example 1, except that a $LiCoO_2$ positive active material including a $Mg_2P_2O_7$ coating layer was used instead of the $LiCoO_2$ positive active material. The amount of the $Mg_2P_2O_7$ coating layer was 0.1 wt % based on the total weight of the positive active material.

COMPARATIVE EXAMPLE 4

A rechargeable lithium battery cell was fabricated according to the same method as described in Comparative Example 1, except that 1.3M $LiPF_6$ dissolved in a mixed solvent of ethylene carbonate, dimethyl carbonate, and ethylmethyl carbonate in a volume ratio of 30:30:40, and then adiponitrile was added to prepare an electrolyte solution. The amount of the adiponitrile was 2 wt % based on the entire weight of the electrolyte solution.

COMPARATIVE EXAMPLE 5

A rechargeable lithium battery cell was fabricated according to the same method as described in Comparative Example 4, except that a $LiCo_{0.98}Mg_{0.02}O_2$ positive active material was used instead of the $LiCoO_2$ positive active material.

COMPARATIVE EXAMPLE 6

A rechargeable lithium battery cell was fabricated according to the same method as described in Comparative Example 1, except that a $LiCo_{0.98}Mg_{0.02}O_2$ positive active material including a $Mg_2P_2O_7$ coating layer was used instead of the $LiCoO_2$ positive active material.

COMPARATIVE EXAMPLE 7

A rechargeable lithium battery cell was fabricated according to the same method as described in Comparative Example 4, except that a $LiCoO_2$ positive active material including a $Mg_2P_2O_7$ coating layer was used instead of the $LiCoO_2$ positive active material. The amount of the $Mg_2P_2O_7$ coating layer was 0.1 wt % based on the entire positive active material weight.

18650 cylindrical rechargeable lithium battery cells, prepared according to Examples 1 to 80 and Comparative Examples 1 to 7, were tested. The battery cells are first charged at 0.5 C and then discharged at 0.2 C as a formation charge and discharge process, and then charged at 0.5 C and discharged at 0.2 C as a standard charge and discharge process. The discharge capacities of all battery cells in the test at a third cycle of the standard charge and discharge process were measured to be 2800 mAh.

The cycle-life characteristics of the battery cells were measured by repeating charging at 1.0 C and discharging at 1.0 C for 300 cycles at 60° C. The measurement results are shown in Tables 1 to 3. The cycle-life measurement results in Tables 1 to 3 refer to a ratio of the $300^{th}$ cycle discharge capacity relative to a first cycle discharge capacity.

The battery cells were charged to the cut-off voltage of 4.35V at 60° C., and then continuously charged while maintaining 4.35V. The results are shown in Tables 1 to 3. The continuous charging time at 4.35V at high temperature was measured to characterize a trickle charging time at which a current is sharply increased during the continuous charging. In the following Tables 1 to 3, SN refers to succinonitrile, GN refers to glutaronitrile, AN refers to adiponitrile, PN refers to pimelonitrile, and UN refers to suberonitrile. The doping element in Tables 1 to 3 refers to M' of Formula I or II.

TABLE 1

| | Doping element | Coating compound | Additive | 300th cycle-life at 60° C. (%) | Continuous charging time at high temperature (Hrs) |
|---|---|---|---|---|---|
| Comparative Example 1 | — | — | — | 31 | 25 |
| Comparative Example 2 | Mg | — | — | 69 | 27 |
| Comparative Example 3 | — | $Mg_2P_2O_7$ | — | 64 | 35 |
| Comparative Example 4 | — | — | AN | 38 | 75 |
| Comparative Example 5 | Mg | — | AN | 72 | 104 |
| Comparative Example 6 | Mg | $Mg_2P_2O_7$ | — | 71 | 41 |
| Comparative Example 7 | — | $Mg_2P_2O_7$ | AN | 62 | 107 |
| Example 1 | Mg | $Al_2O_3$ | SN | 80 | 107 |
| Example 2 | | | GN | 81 | 141 |
| Example 3 | | | AN | 80 | 172 |
| Example 4 | | | PN | 79 | 202 |
| Example 5 | | | UN | 78 | 230 |
| Example 6 | | $Mg_2P_2O_7$ | SN | 83 | 110 |
| Example 7 | | | GN | 81 | 145 |
| Example 8 | | | AN | 83 | 180 |
| Example 9 | | | PN | 82 | 207 |
| Example 10 | | | UN | 79 | 242 |
| Example 11 | | $AlPO_4$ | SN | 79 | 99 |
| Example 12 | | | GN | 80 | 131 |
| Example 13 | | | AN | 79 | 162 |
| Example 14 | | | PN | 78 | 192 |
| Example 15 | | | UN | 76 | 221 |
| Example 16 | | $ZrO_2$ | SN | 82 | 99 |
| Example 17 | | | GN | 81 | 131 |
| Example 18 | | | AN | 83 | 162 |
| Example 19 | | | PN | 81 | 192 |
| Example 20 | | | UN | 78 | 221 |
| Example 21 | Mg + Al | $Al_2O_3$ | SN | 78 | 92 |
| Example 22 | | | GN | 79 | 123 |
| Example 23 | | | AN | 78 | 157 |
| Example 24 | | | PN | 77 | 187 |
| Example 25 | | | UN | 76 | 215 |
| Example 26 | | $Mg_2P_2O_7$ | SN | 81 | 95 |
| Example 27 | | | GN | 79 | 125 |
| Example 28 | | | AN | 81 | 165 |
| Example 29 | | | PN | 80 | 192 |
| Example 30 | | | UN | 77 | 227 |

TABLE 2

| | Doping element | Coating compound | additive | 300th cycle-life at 60° C. (%) | Continuous charging time at high temperature (Hrs) |
|---|---|---|---|---|---|
| Example 31 | Mg + Al | $AlPO_4$ | SN | 77 | 84 |
| Example 32 | | | GN | 78 | 116 |
| Example 33 | | | AN | 77 | 148 |
| Example 34 | | | PN | 76 | 177 |
| Example 35 | | | UN | 74 | 206 |
| Example 36 | | $ZrO_2$ | SN | 80 | 84 |
| Example 37 | | | GN | 79 | 116 |
| Example 38 | | | AN | 81 | 147 |
| Example 39 | | | PN | 79 | 177 |
| Example 40 | | | UN | 76 | 205 |
| Example 41 | Mg + Ti | $Al_2O_3$ | SN | 80 | 113 |
| Example 42 | | | GN | 78 | 144 |
| Example 43 | | | AN | 80 | 178 |
| Example 44 | | | PN | 79 | 208 |
| Example 45 | | | UN | 76 | 236 |
| Example 46 | | $Mg_2P_2O_7$ | SN | 76 | 116 |
| Example 47 | | | GN | 77 | 146 |
| Example 48 | | | AN | 76 | 186 |
| Example 49 | | | PN | 75 | 213 |
| Example 50 | | | UN | 73 | 248 |
| Example 51 | | $AlPO_4$ | SN | 79 | 105 |
| Example 52 | | | GN | 78 | 137 |
| Example 53 | | | AN | 80 | 169 |

TABLE 2-continued

| | Doping element | Coating compound | additive | 300th cycle-life at 60° C. (%) | Continuous charging time at high temperature (Hrs) |
|---|---|---|---|---|---|
| Example 54 | | | PN | 78 | 198 |
| Example 55 | | | UN | 75 | 227 |
| Example 56 | | $ZrO_2$ | SN | 75 | 105 |
| Example 57 | | | GN | 76 | 137 |
| Example 58 | | | AN | 75 | 168 |
| Example 59 | | | PN | 74 | 198 |
| Example 60 | | | UN | 73 | 226 |
| Example 61 | Mg + Al + Ti | $Al_2O_3$ | SN | 78 | 84 |
| Example 62 | | | GN | 76 | 115 |
| Example 63 | | | AN | 78 | 149 |
| Example 64 | | | PN | 77 | 179 |
| Example 65 | | | UN | 74 | 207 |
| Example 66 | | $Mg_2P_2O_7$ | SN | 74 | 87 |
| Example 67 | | | GN | 75 | 117 |
| Example 68 | | | AN | 74 | 157 |
| Example 69 | | | PN | 73 | 184 |
| Example 70 | | | UN | 71 | 219 |

TABLE 3

| | Doping element | Coating compound | additive | 300th cycle-life at 60° C. (%) | Continuous charging time at high temperature (Hrs) |
|---|---|---|---|---|---|
| Example 71 | | $AlPO_4$ | SN | 77 | 76 |
| Example 72 | | | GN | 76 | 108 |
| Example 73 | | | AN | 78 | 140 |
| Example 74 | | | PN | 76 | 169 |
| Example 75 | | | UN | 73 | 198 |
| Example 76 | | $ZrO_2$ | SN | 77 | 86 |
| Example 77 | | | GN | 75 | 108 |
| Example 78 | | | AN | 77 | 139 |
| Example 79 | | | PN | 76 | 169 |
| Example 80 | | | UN | 73 | 197 |

As shown in Tables 1 to 3, the battery cells prepared according to Examples 1 to 80, in which a $LiCo_{0.98}M'_{0.02}O_2$ active material including a coating layer, and an electrolyte solution including the nitrile-based additive were used, showed higher 300th cycle-life characteristics at temperature of 60° C., or longer continuous charging time at high temperature than those of Comparative Examples 1 to 7, in which the coating layer was not formed, the doping element was not included in the core material, and the nitrile-based additive was not used.

EXAMPLE 81 TO 91 AND REFERENCE EXAMPLE 1

Rechargeable lithium battery cells were fabricated according to the same method as described in Example 8, except that the amount of adiponitrile was changed as shown in Table 4.

18650 cylindrical rechargeable lithium battery cells prepared according to Examples 81 to 91 and Reference Example 1 were charged at 0.5 C and then discharged at 0.2 C as a formation charge and discharge process, and then charged at 0.5 C and discharged at 0.2 C as a standard charge and discharge process. The discharge capacities of the battery cells at a third cycle of the standard charge and discharge were measured to be 2800 mAh.

The cycle-life characteristics of the battery cells were measured by repeating charging at 1.0 C and discharging at 1.0 C for 300 cycles at 60° C. The measurement results are shown in Table 4. The cycle-life measurement results in Table 4 refer to a ratio of the 300th cycle discharge capacity relative to a first cycle discharge capacity.

The battery cells were charged to the cut-off voltage of 4.35V at 60° C., and then continuously charged while maintaining 4.35V. The results are shown in Table 4.

Table 4 shows the measurement results of cycle-life and continuous charging time of battery cells of Comparative Example 6, Examples 81 to 92, and Reference Example 1, as a function of the amount of adiponitrile.

TABLE 4

| | Amount of AN additive (wt %) | 300th cycle-life at 60° C. (%) | Continuous charging time at high temperature (Hrs) |
|---|---|---|---|
| Comparative Example 6 | 0 | 71 | 41 |
| Example 81 | 0.001 | 75 | 72 |
| Example 82 | 0.005 | 76 | 82 |
| Example 83 | 0.01 | 77 | 108 |
| Example 84 | 0.025 | 80 | 121 |
| Example 85 | 0.05 | 81 | 132 |
| Example 86 | 1 | 82 | 151 |
| Example 87 | 2 | 83 | 180 |
| Example 88 | 5 | 72 | 207 |
| Example 89 | 7 | 72 | 223 |
| Example 90 | 8 | 71 | 230 |
| Example 91 | 10 | 71 | 241 |
| Reference Example 1 | 11 | 68 | 263 |

As shown in Table 4, the battery cells of Examples 81 to 91, in which a $LiCo_{0.98}M'_{0.02}O_2$ active material including a coating layer, and an electrolyte solution including 0.001 to 10 wt % of the adiponitrile-based additive were used, showed higher 300th cycle-life characteristics at temperature of 60° C. or longer continuous charging time at high temperature than that of Comparative Example 6 where the adiponitrile content was out of the range. Further, the battery cell according to Reference Example 1, in which more than 10 wt % of adiponitrile was used, showed good continuous charging time at high temperature but poor 300th cycle-life characteristics at temperature of 60° C.

EXAMPLE 92 TO 101 AND REFERENCE EXAMPLE 2

Rechargeable lithium battery cells were fabricated according to the same method as described in Example 8, except that the $Mg_2P_2O_7$ coating amount was changed as shown in Table 5.

18650 cylindrical rechargeable lithium battery cells prepared according to Examples 92 to 101 and Reference Example 2 were charged at 0.5 C and then discharged at 0.2 C as a formation charge and discharge process, and then charged at 0.5 C and discharged at 0.2 C as a standard charge and discharge process. The discharge capacities of the battery cells at third cycle of the standard charge and discharge were measured to be 2800 mAh.

The battery cells were charged at 1.0 C and discharged at 1.0 C, and discharge capacities after 300 cycles at 60° C. were measured to characterize cycle-life characteristics. The measurement results are shown in Table 5. The cycle-life measurement results in Table 5 refer to a ratio of the $300^{th}$ cycle discharge capacity relative to a first cycle discharge capacity.

The battery cells were charged to the cut-off voltage of 4.35V at 60° C., and then continuously charged while maintaining 4.35V. The results are shown in Table 5.

Table 5 shows the measurement results of cycle-life and continuous charging time of battery cells of Comparative Example 5, Examples 92 to 101, and Reference Example 2, as a function of the amount of $Mg_2P_2O_7$.

TABLE 5

| | Coating amount of $Mg_2P_2O_7$ (wt %) | 300th cycle-life at 60° C. (%) | Continuous charging time at high temperature (Hrs) |
|---|---|---|---|
| Comparative Example 5 | 0 | 72 | 104 |
| Example 92 | 0.001 | 72 | 123 |
| Example 93 | 0.005 | 73 | 134 |
| Example 94 | 0.01 | 75 | 142 |
| Example 95 | 0.05 | 77 | 167 |
| Example 96 | 0.1 | 83 | 180 |
| Example 97 | 0.5 | 82 | 182 |
| Example 98 | 1 | 81 | 179 |
| Example 99 | 2 | 80 | 172 |
| Example 100 | 5 | 79 | 165 |
| Example 101 | 10 | 74 | 141 |
| Reference Example 2 | 20 | 62 | 103 |

As shown in Table 5, the battery cells of Examples 92 to 101, in which a $LiCo_{0.98}M'_{0.02}O_2$ active material including a coating layer included in an amount of 0.005 to 10 wt % was used, showed higher 300th cycle-life characteristics at temperature of 60° C., or longer continuous charging time at high temperature than that of Comparative Example 5 where the coating layer content was out of the range. Furthermore, the battery cell of Reference Example 2, in which the coating layer content was used in an amount of more than 10 wt %, showed a reduced continuous charging time at high temperature and reduced 300th cycle-life characteristics at temperature of 60° C.

EXAMPLES 102 TO 111 AND REFERENCE EXAMPLE 3

Rechargeable lithium battery cells were fabricated according to the same method as described in Example 3, except that the amounts of the $Al_2O_3$ coating layer were changed as shown in Table 6.

18650 cylindrical rechargeable lithium battery cells according to Examples 102 to 111 and Reference Example 3 were charged at 0.5 C and then discharged at 0.2 C as a formation charge and discharge process, and then charged at 0.5 C and discharged at 0.2 C as a standard charge and discharge process. The discharge capacities of the battery cells at third cycle of the standard charge and discharge were measured to be 2800 mAh.

The battery cells were charged at 1.0 C and discharged at 1.0 C, and capacities after 300 cycles at 60° C. were measured to characterize cycle-life characteristics. The measurement results are shown in Table 6. The cycle-life measurement results in Table 6 refer to a ratio of the 300$^{th}$ cycle discharge capacity relative to a first cycle discharge capacity.

The battery cells were charged to the cut-off voltage of 4.35V at 60° C., and then continuously charged while maintaining 4.35V. The results are shown in Table 6.

The measurement results of cycle-life and continuous charging time of Comparative Example 5, Examples 102 to 111, and Reference Example 3 are shown in Table 6, as a function of the amount of $Al_2O_3$.

TABLE 6

| | Coating amount of $Al_2O_3$ (wt %) | 300th cycle-life at 60° C. (%) | Continuous charging time at high temperature (Hrs) |
|---|---|---|---|
| Comparative Example 5 | 0 | 72 | 104 |
| Example 102 | 0.001 | 72 | 121 |
| Example 103 | 0.005 | 74 | 132 |
| Example 104 | 0.01 | 81 | 143 |
| Example 105 | 0.05 | 84 | 165 |
| Example 106 | 0.1 | 80 | 172 |
| Example 107 | 0.5 | 80 | 179 |
| Example 108 | 1 | 79 | 181 |
| Example 109 | 2 | 79 | 180 |
| Example 110 | 5 | 78 | 175 |
| Example 111 | 10 | 77 | 145 |
| Reference Example 3 | 20 | 62 | 109 |

As shown in Table 6, the battery cells of Examples 102 to 111, in which a $LiCo_{0.98}M'_{0.02}O_2$ active material including a coating layer included in an amount of 0.005 to 10 wt % was used, showed higher 300th cycle-life characteristics at temperature of 60° C., or longer continuous charging time at high temperature than that of Comparative Example 5 where the coating layer content was out of the range. Further, the battery cell according to Reference Example 3 where the coating layer content was used in an amount of more than 10 wt % showed a reduced continuous charging time at high temperature and reduced 300th cycle-life characteristics at temperature of 60° C.

As described above, the rechargeable lithium battery of the present invention has excellent cycle-life characteristics and stability by the use of a positive active material that is a specific compound including an optimum amount of a coating layer and an electrolyte solution additive that includes a nitrile-based compound.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
a positive electrode including a positive active material that includes a core and a coating layer formed on the core;
a negative electrode including a negative active material; and
a non-aqueous electrolyte that includes a non-aqueous organic solvent, a lithium salt, and an additive represented by Formula XI;
wherein
the core of the positive active material is made of a material selected from the group consisting of the materials represented by Formulas I and II;
a coating layer of the positive active material includes a material represented by $M_xP_yO_z$, wherein M is selected from the group consisting of an alkali metal, an alkaline-earth metal, a Group 13 element, a Group 14 element, a transition element, a rare earth element, and combinations thereof, $1 \leq x \leq 4$, $0 \leq y \leq 7$, and $2 \leq z \leq 30$, and an amount of the coating layer ranges from 0.001 wt % to 10 wt % based on the total weight of the positive active material; wherein $Li_{a1}Ni_{b1}Co_cMn_dM'_eO_2$    Formula I wherein 0.95≤a1≤1.1, 0≤b1≤0.999, 0≤c≤0.999, 0≤d≤0.999, 0.001≤e≤0.2, and M' is selected from the group consisting of an alkali metal, an alkaline-earth metal, a Group 13 element, a Group 14 element, a transition element other than Ni, Co, or Mn, a rare earth element, and combinations thereof, $Li_{a2}Mn_2M'_{b2}O_4$  Formula II wherein 0.95≤a2≤1.1, 0.001≤b2≤0.2, and M' is selected from the group consisting of an alkali metal, an alkaline-earth metal, a Group 13 element, a Group 14 element, a transition element other than Mn, a rare earth element, and combinations thereof, and Formula XI

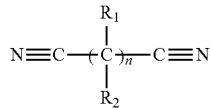

wherein R1 and R2 are the same or independently a halogen or $C_mH_{(2m+1)}$, m ranges from 0 to 10, and n ranges from 1 to 12.

2. The rechargeable lithium battery of claim 1, wherein the amount of the coating layer ranges from 0.05 wt % to 5 wt % based on the total weight of the positive active material.

3. The rechargeable lithium battery of claim 1, wherein e of Formula I ranges from 0.005≤e≤0.1.

4. The rechargeable lithium battery of claim 1, wherein d of Formula I ranges from 0≤d≤0.667.

5. The rechargeable lithium battery of claim 1, wherein b2 of Formula II ranges from 0.005≤b2≤0.1.

6. The rechargeable lithium battery of claim 1, wherein the coating layer includes a compound selected from the group consisting of $Al_2O_3$, $Mg_2P_2O_7$, $AlPO_4$, $ZrO_2$, and combinations thereof.

7. The rechargeable lithium battery of claim 6, wherein the coating layer comprises $Al_2O_3$ or $Mg_2P_2O_7$.

8. The rechargeable lithium battery of claim 1, wherein
M' in the core material represented by Formula I or II is selected from the group consisting of Mg, Al, Ti, and combinations thereof.

9. The rechargeable lithium battery of claim 1, wherein the coating layer comprises $Al_2O_3$ or $Mg_2P_2O_7$,
and
M' in the core material represented by Formula I or II is selected from the group consisting of a combination of Mg and Al, a combination of Mg and Ti, and a combination of Mg, Al, and Ti.

10. The rechargeable lithium battery of claim 1, wherein an amount of the additive of the non-aqueous electrolyte ranges from 0.01 wt % to 7 wt % based on the total weight of the non-aqueous electrolyte.

11. The rechargeable lithium battery of claim 1, wherein the positive electrode has an active mass density of 3.7 g/cc to 4.2 g/cc.

12. The rechargeable lithium battery of claim 1, wherein the rechargeable lithium battery has a charge cut-off voltage of 4.3V to 4.5V.

13. The rechargeable lithium battery of claim 1, wherein the additive having Formula XI is a nitrile-based compound selected from the group consisting of succinonitrile, glutaronitrile, adiponitrile, pimelonitrile, suberonitrile, and combinations thereof.

14. The rechargeable lithium battery of claim 13, wherein the nitrile-based compound is selected from the group consisting of succinonitrile, adiponitrile, and combinations thereof.

15. The rechargeable lithium battery of claim 14, wherein the nitrile-based compound includes adiponitrile.

16. The rechargeable lithium battery of claim 1, wherein the negative active material is selected from the group consisting of a carbonaceous material, a lithium metal, a lithium alloy, a material being capable of forming a lithium-containing compound, and combinations thereof.

17. The rechargeable lithium battery of claim 16, wherein the negative active material includes a carbonaceous material.

18. The rechargeable lithium battery of claim 17, wherein the carbonaceous material has an crystallite size of at least 10 nanometers, and has an exothermic peak at temperature no lower than 700° C.

19. The rechargeable lithium battery of claim 18, wherein the carbonaceous material is a carbon prepared by carbonizing mesophase spherical particles and performing a graphitizing step on the carbonized material, or a graphite fiber prepared by carbonizing a mesophase pitch fiber and performing a graphitizing step on the carbonized material.

20. The rechargeable lithium battery of claim 1, wherein the non-aqueous organic solvent is selected from the group consisting of carbonate-based, ester-based, ether-based, ketone-based, alcohol-based, and aprotic solvents.

21. The rechargeable lithium battery of claim 1, wherein the lithium salt includes one selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein x and y are positive integers), LiCl, LiI, lithium bisoxalate borate, and combinations thereof.

22. The rechargeable lithium battery of claim 1, wherein an amount of the lithium salt ranges from 0.1 M to 2.0M.

23. The rechargeable lithium battery of claim 1, wherein the amount of the additive in the non-aqueous electrolyte ranges between 0.001 wt % to 10 wt %.

* * * * *